United States Patent [19]

Carter

[11] Patent Number: 4,552,327

[45] Date of Patent: Nov. 12, 1985

[54] HYDRAULIC EJECTOR

[75] Inventor: William R. Carter, Jamestown, N. Dak.

[73] Assignee: Western Gear Corporation, Jamestown, N. Dak.

[21] Appl. No.: 533,675

[22] Filed: Sep. 19, 1983

[51] Int. Cl.⁴ ............................................. B64D 1/12
[52] U.S. Cl. ................................. 244/137 R; 60/413; 89/1.54
[58] Field of Search ................ 244/137 R; 89/1.5 C, 89/1.5 H, 1.5 R, 1.5 G; 138/31; 60/413, 415

[56] References Cited

U.S. PATENT DOCUMENTS

| | | | |
|---|---|---|---|
| 1,905,133 | 4/1933 | Bishop et al. | 138/31 |
| 3,548,708 | 12/1970 | Hubich | 89/1.818 |
| 3,756,545 | 9/1973 | Coutin | 244/137 A |
| 3,813,701 | 6/1974 | Stevens | 138/31 |
| 3,863,676 | 2/1975 | Tarsha | 138/31 |
| 4,095,762 | 6/1978 | Holt | 244/137 R |
| 4,256,145 | 3/1981 | Phillips | 138/31 |
| 4,263,835 | 4/1981 | Dragonuk | 89/1.5 R |
| 4,377,103 | 3/1983 | Kovalenko | 244/137 A |
| 4,388,853 | 6/1983 | Griffin et al. | 244/137 A |
| 4,399,968 | 8/1983 | Stock et al. | 244/137 A |

FOREIGN PATENT DOCUMENTS 2701895  9/1977  Fed. Rep. of Germany ... 244/137 A

Primary Examiner—Trygve M. Blix
Assistant Examiner—Paul J. Bednar

[57] ABSTRACT

A store ejection apparatus having fluid energy accumulator means for receiving a fluid charge during system pressurization for subsequent supplying of the fluid charge to the ejectors during the ejection of a store.

10 Claims, 1 Drawing Figure

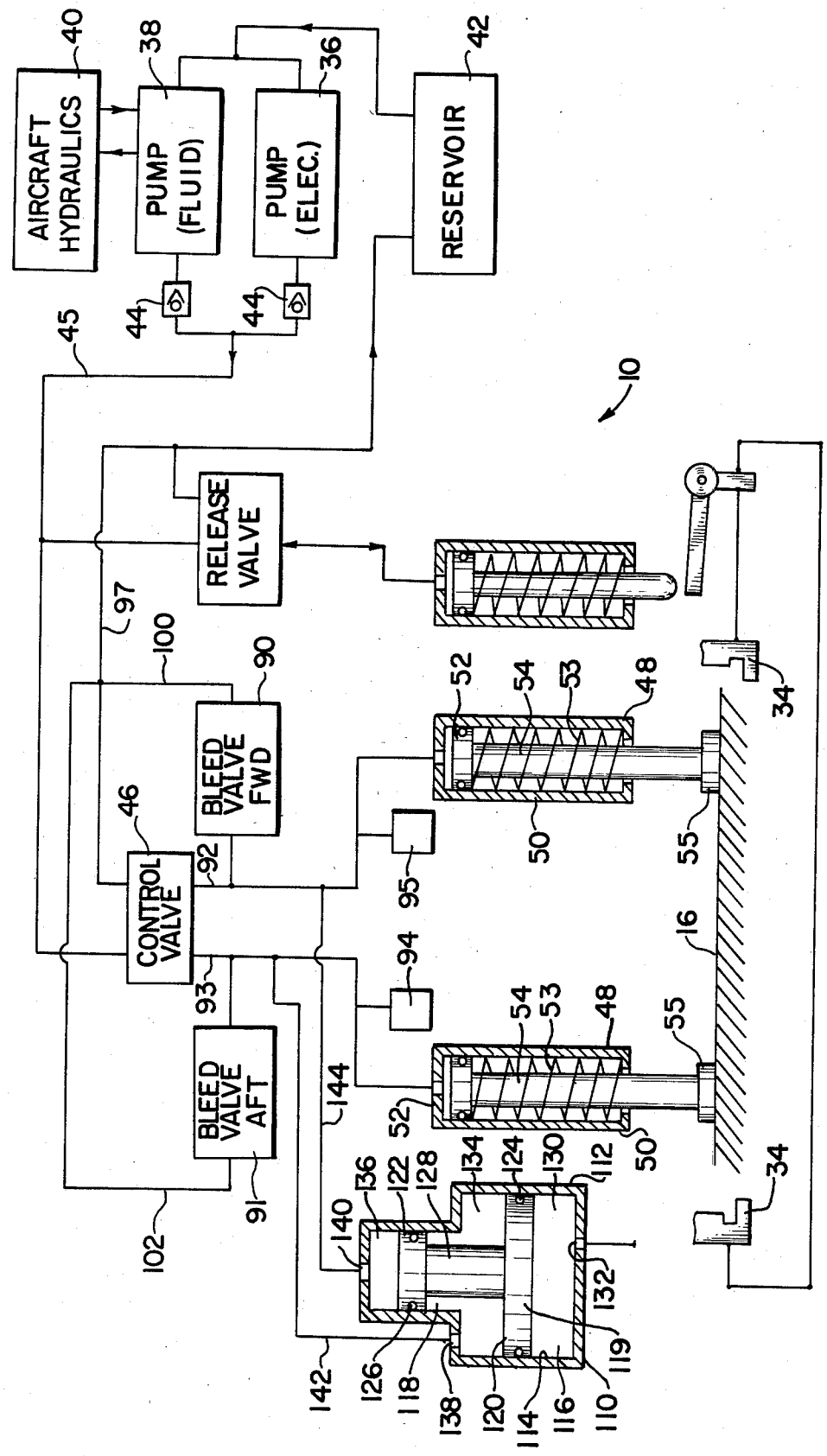

HYDRAULIC EJECTOR

BACKGROUND OF THE INVENTION

It is well known in the airborne launching of stores such as missiles, bombs or weather monitors to utilize an aircraft equipped with an ejector for ejecting the stores clear of the aircraft upon release or launch of the store. Such ejectors typically are intended to eject the store transversely from the carrier and clear of the aircraft upon release of the store from its carrier in order to ensure that the store will traverse the turbulent air flow around the aircraft without incurring undesirable deviations from the desired pitch and yaw attitude. Such deviations may cause the store to strike the aircraft or may result in store targeting and delivery error. Disclosure of prior ejectors for airborne launching systems is included in U.S. Pat. Nos. 2,826,120, 3,756,545, 3,936,019, 3,960,051, 3,974,990, 4,088,287, 4,092,762, and 4,187,761.

The prior art of ejector systems for airborne launch systems has commonly included pyrotechnic type devices in which, upon ignition of a pyrotechnic charge, an explosion of hot gases is channeled to an extendable ejector device. The ejector device is in contact with a store such that the expanding gases rapidly extend the ejector to forcefully eject the store clear of the aircraft. Such prior pyrotechnic ejector systems exhibit considerable sensitivity to the quantity, composition and quality of the explosive load in the cartridge, are subject to post-ignition residue accumulation in the ejector system which necessitates frequent cleaning and maintenance, are often limited to a single shot operating cycle for a given mission and typically do not accomodate in-flight rearming.

Combined fluid/mechanical ejectors are also known, as for example the ejector described in the above cited U.S. Pat. No. 4,095,762, according to which a compressed-gas powered piston arrangement acts upon a closed volume of hydraulic fluid to deliver hydraulic fluid flow to fluid operable ejector pistons upon release of a mechanical latch which retains the fluid drive pistons in a cocked or ready position. As in other prior ejector systems, this prior system requires a mechanical latch for cocking or setting the ejectors and for mechanical release or actuation of the ejectors. Thus, it is possible that the ejectors might be actuated independently of the release of the store from its carrier, or that the ejectors might fail to actuate upon release of the store from the carrier. In addition, the closed hydraulic system offers no apparent possibility of establishing and maintaining a specified hydraulic fluid pressure or of maintaining contact between the ejector pistons and the store to be ejected prior to ejector actuation. These shortcomings may adversely affect the reliability and uniformity of ejector operation.

U.S. patent application Ser. No. 489,644 of Larry G. Ellis et. al. is distinguished from the above mentioned U.S. Pat. No. 4,095,762 in that it discloses a hydraulic ejector system wherein a hydraulic power source is operable, through controlled valving of hydraulic fluid, to cock or set the ejector system for an ejection cycle and to initiate the ejection cycle without need of mechanical latches, releases, or other such ejector trigger mechanisms apart from the sotre carrier latches. The system of application Ser. No. 489,644 thus alleviates some of the shortcomings of other prior ejector systems in that it is cocked or set by charging a hydraulic actuation system, including hydraulic ejector pistons, with hydraulic fluid pressure such that the ejector pistons will extend under fluid impetus to contact the store and maintain fluid pressure biased contact therewith. Upon release of the respective store from the carrier the ejector pistons extend under the applied fluid pressure impetus to eject the store without any requirement for interaction between a mechanical store release device and a mechanical ejector actuation device.

SUMMARY OF THE INVENTION

The present invention contemplates an improved hydraulic ejector for use in a hydraulic ejector system which is operable in the manner of the above cited application Ser. No. 489,644 wherein the ejectors are in biased engagement with the store to initiate an ejector operating cycle upon release of the store to be ejected. The invention contemplates a hydraulic ejector including a gas pressure accumulator for use in storing the energy of pressurized hydraulic fluid flow supplied from a fluid flow source to subsequently drive hydraulically powered ejector piston assemblies through the ejection cycle.

In a preferred embodiment of the invention the accumulator includes a common variable volume energy storage chamber which is precharged to a suitable pressure with a compressible medium such as $N_2$ gas. A pair of hydraulic fluid receiving variable volume chambers is provided, into which hydraulic fluid flow from the fluid flow source is directed to drive an accumulator piston through a cocking stroke and thereby further compress the $N_2$ gas charge to store fluid pressure energy in the compressed gas. Upon release of a store, the accumulator piston is driven by the compressed gas charge through a return stroke thereby providing bias for fluid powered extension of the ejector pistons and consequent ejection of the store. During the system charging or cocking cycle, the ejector pistons are maintained in fluid flow communication with both the accumulator and the hydraulic fluid flow source such that they are pressurized or precharged to system operating pressure simultaneously with compression of the gas precharge in the energy storage chamber of the accumulator. The invention thus provides the advantages of improved simplicity of design and operation as well as improved reliability and uniformity for a hydraulic ejector system by permitting the storage of a known amount of energy from a hydraulic power system in a body of compressed gas for subsequent rapid expansion and consequent rapid fluid energy application to a fluid operable ejector device.

Accordingly, it is one primary object of the present invention to provide an improved hydraulically powered ejector for use in ejection of stores from an aircraft.

Another primary object of the invention is to provide a hydraulic ejector including fluid operable ejector piston assemblies and a fluid pressure energy accumulator means maintained in common fluid communication therewith and in selectively controlled fluid communication with a hydraulic fluid flow source.

Yet another object of the invention is to provide an ejector means including a fluid pressure energy accumulator or intensifier for use in a pressure fluid operable and pressure fluid actuated store ejection system.

These and other objects and advantages of the invention will be more readily understood upon consideration of the following description of the invention and the sole accompanying FIGURE in which there is shown a schematic representation of a hydraulic ejection system of the present invention.

There is generally indicated at 10 in the FIGURE a hydraulic ejection system for use in ejecting stores 16 from an aircraft (not shown) and including hydraulic ejectors and an intensifier or accumulator according to one presently preferred embodiment of the invention. An ejection fluid supply system 30 may be of any suitable configuration for the intended purpose, the following description of the fluid supply system as shown in the FIGURE is exemplary in nature. The system 10 may be powered by an electrically driven pump 36, a fluid powered pump 38 which is driven by aircraft hydraulics 40, by aircraft hydraulics directly or by any other suitable source of hydraulic fluid flow. The hydraulic fluid flow is transmitted to the inlet of a control valve 46 via a pressure fluid conduit 45. A return port of valve 46 is connected to a return conduit 97 for recirculation of the fluid to a reservoir 42. Two common outlet ports of valve 46 are connected to conduits 92 and 93. In a neutral or central position of valve 46 the outlet ports are closed. For a system charge cycle, pressure fluid flow from conduit 45 is split between conduits 92 and 93. For the retract cycle the pressure or inlet port of valve 46 is closed and fluid flows from conduits 92 and 93 through valve 46 via the return port and return conduit 97 to reservoir 42.

Among other components connected to outlet conduits 92, 93 are, respectively, the inlets of forward and aft bleed valves 90, 91 and forward and aft pressure transducers 95, 94 which are operative to permit control of fluid pressure within system 10. These are otherwise unrelated to the present invention which concerns a fluid pressure accumulator 110 and its cooperation with a pair of ejectors 98, 48 for utilization of hydraulic pressure fluid energy developed by hydraulic fluid flow from valve 46 via conduits 92 and 93.

Accumulator assembly 110 includes a suitable rigid housing 112 having defined therein a stepped cylindrical bore 114. Bore 114 includes a relatively enlarged diameter portion 116 and a coaxially adjacent, relatively smaller diameter portion 118 which preferably is one-half the cross sectional area of bore portion 116. Inasmuch as the housing 112 is illustrated schematically, it will be understood that accepted and prudent design practice is to be utilized in the design of housing 112 so as to provide a design which is suitably consistent with constraints of the applicable design parameters, manufacturing economy, ease of assembly and other relevant considerations.

Within 114 there is disposed a piston assembly 119 including two piston heads 120, 122 slideably disposed within the respective bore portions 116, 118 and sealingly engaged therein by respective perimeter pressure seals 124, 126. Piston heads 120, 122 are connected together at a fixed separation by an axially extending rod 128 for axial motion in unison within respective bore portions 116, 118.

Variable volume fluid receiving chambers are defined within bore 114 by piston heads 120, 122 and housing 112 as follows. A variable volume energy accumulator chamber 130 is defined within bore portion 116 beneath piston head 120. An inlet 132 is provided in housing 112 for directing a suitable compressible medium such as $N_2$ gas, for example, into chamber 130 from any suitable source such as a pressurized gas bottle (not shown). Inlet 132 preferably is valved to permit a gas precharge at any suitable precharge pressure to be maintained within chamber 130 in isolation from the exterior of housing 112.

Working chambers 134, 136 are also defined within bore 114. Chamber 134 is defined axially intermediate piston heads 120 and 122 within adjacent parts of bore portions 116 and 118 and chamber 136 is defined above piston head 122 within bore portion 118. Chambers 134 and 136 communicate with the respective fluid flow conduits 93, 92 via respective fluid inlet-outlet connections 138 and 140 in housing 112 and fluid flow conduits 142, 144 connected thereto. Thus, it will be appreciated that hydraulic fluid flow delivered to working chambers 134, 136 via respective conduits 142, 144 will urge piston heads 122 and 120 downwardly against the bias of the $N_2$ gas precharge contained within chamber 130 to further compress the $N_2$ gas charge and store fluid pressure energy therein for subsequent use in driving ejector assemblies 98 and 48.

Working chambers 134, 136 preferably are proportioned to provide equal fluid volume displacement therein for a given stroke of piston assembly 119, and preferably are of a maximum displacement volume to permit the fluid displaced therefrom to drive the respective ejector assemblies 98, 48 through a full effective ejection stroke.

Each of forward and aft ejector piston assemblies 98, 48 includes a cylinder 50 within which a piston head 52 is axially movable under the impetus of the pressure fluid supplied thereto. An elongated piston stem 54 is secured to each piston head 52 and projects from one end of the respective cylinder 50. An outermost end of each stem 54 is suitably formed as at 55 to conform with a contact portion of a store 16 located in the launch position.

Ejection system 30 cooperates with a mechanical release means to release retaining hooks 34 from store 16 through the action of a mechanical linkage train of any suitable kind known in the art to provide for selective release of stores for launching thereof.

It will be appreciated that the piston stems 54 in each ejector assembly 48, 98 must be retracted after each injection cycle for recycling of the ejector system and to permit a new store to be moved into the launch position adjacent the ejector assemblies 98, 48. Accordingly, each ejector assembly 98, 48 is equipped with a resilient bias means such as a helical compression spring 53 which encompasses the respective stem portions 54 and is maintained in biased engagement with the piston head 52 to continuously urge the piston head toward the retracted position. When valve 46 is in the return or exhaust position, fluid flows from ejectors 48, 98 under the impetus of springs 53 via conduits 93 and 92 and thence via return conduit 97 to reservoir 42.

The spring rate and minimum bias of springs 53 as installed within ejector assemblies 48 and 98 must be carefully selected to ensure that the spring bias does not adversely influence the action of accumulator 110.

The operating sequence of the ejector system 30 with accumulator 110 is as follows: When the store 16 is ready for launch, the pressure conduit 45 is supplying hydraulic pressure fluid to control valve 46. Thus, when control valve 46 is shifted open, pressurized fluid flows via conduits 92, 93 to ejectors 98 and 48, and via connected conduits 144, 142 to accumulator working chambers 136, 134, respectively. Ejector piston heads 52 stroke downwardly against the bias of springs 53 under the fluid flow impetus until the outer end 55 of each contacts the store 16 located in the launch position. As fluid continues to flow from valve 46 into conduits 92 and 93, it is diverted via conduits 142 and 144 to respective working chambers 134 and 136 in accumulator 110. In response, heads 120 and 122 stroke downwardly in unison to compress the gas precharge in chamber 130 until the system pressure (i.e. the pressure in chambers 130, 134, 136 and on ejector piston heads 52) is equal to the hydraulic fluid supply pressure, or until pressure transducers 94, 95 signal that the desired system operating pressure has been established. Control valve 46 is then closed, and the ejector system is thus set or cocked for an ejection cycle.

When store 16 is to be launched, the mechanical release apparatus is actuated to disengage retaining hooks 34. As the hooks 34 open, the ejector pistons 52 extend forcefully under the impetus of hydraulic fluid pressure resulting from the pressure of the compressed gas in chamber 130. As ejector pistons 52 extend, the gas precharge in accumulator chamber 130 expands to stroke piston heads 120 and 122 upwardly and hydraulic fluid is thus displaced from accumulator working chambers 134, 136 into ejector cylinders 50 via respective conduits 142, 144 and conduits 93, 92.

When the store 16 parts contact with piston stem ends 55 and the ejector pistons are fully extended, the control valve 46 is shifted to the return position and hydraulic fluid in cylinders 50 as well as any residual fluid in working chambers 134, 136 flows back to the reservoir 42 via conduit 97 under the impetus of retraction springs 53 and the $N_2$ gas precharge in chamber 130.

According to the description hereinabove there is provided by the instant invention an ejector for a hydraulically powered ejection system wherein a fluid energy accumulator permits storage of a fluid volume under pressure during the fluid pressure operative cocking or setting cycle of the ejection system. The ejectors are operative without recourse to mechanical release or actuator devices as the pressure of fluid stored by the accumulator is applied continuously to the ejector pistons when the system is set or cocked. The extendable ejector rods are thus maintained in biased engagement with the store throughout the period during which the system is cocked for an ejection operation. During the ejection cycle, the fluid volume stored under pressure in the energy accumulator is delivered to the ejectors to drive the ejector pistons through a full ejection stroke.

A presently preferred embodiment of the invention having been described hereinabove, it is to be understood that various alternative and modified embodiments are contemplated by the inventor. For example, the specific form, proportions and area and volume relationships of accumulator 110 may be varied within a latitude of design practice consistent with the operational requisites described hereinabove; the invention may be utilized with any of a variety of alternative hydraulic fluid flow supply systems and a variety of mechanical store release actuator systems; and the like. Accordingly, the invention is intended to be construed as broadly as permitted by the scope of the claims appended hereto.

I claim:

1. A hydraulic system for controlling the ejection of a store from an aircraft comprising:
   a control means having an inlet means adapted to be connected to a source of pressurized hydraulic fluid and an outlet means, said control means having operable means for selectively hydraulically connecting and disconnecting said inlet means to said outlet means;
   a pair of ejector units having movable members which define variable volume hydraulic chambers within said ejector units, respectively, said movable members having an exterior portion adapted to engage a store, said chambers each being of a selected minimum volume when said movable members are in engagement with a store, said chambers increasing in volume to move said movable members to eject a store,
   an accumulator having a sealed gas chamber with a gas therein at a pressure less than the pressure of such a source, said accumulator having a movable member defining a pair of variable volume accumulator chambers which simultaneously increase in volume as the volume of said gas chamber decreases as the accumulator is charged, said gas chamber and said accumulator chambers changing in the reverse manner when said accumulator is discharged,
   conduit means simultaneously connecting said outlet means to said variable volume chambers of said ejector units and to said accumulator chambers, respectively, whereby when said operable means connects said inlet means to said outlet means, the pressurized hydraulic fluid from such a source simultaneously biases said movable members of said ejector units into engagement with such a store and charges said accumulator by moving said movable member thereof to compress the gas in said gas chamber and whereby, when said inlet means is thereafter disconnected from said outlet means, said store can be ejected by said movable members of said ejector units under the effect of the gas within said gas chamber upon said movable member of said accumulator.

2. A hydraulic system as set forth in claim 1 wherein latch means are adapted to retain a store against the bias of said ejector units, and selectively operable means selectively actuate said latch means to release such a store.

3. A hydraulic ejector system as set forth in claim 2 wherein selectively operable means comprises a hydraulically operable means adapted to be connected to such a source.

4. A hydraulic ejector system as set forth in claim 1 wherein said conduit means includes means for establishing a preselected hydraulic pressure in said accumulator chambers, respectively.

5. A hydraulic ejector system as set forth in claim 1 wherein said variable volumes of said accumulator chambers are equal volumes throughout movement of said movable members of said accumulator.

6. A hydraulic ejector system as set forth in claim 1 wherein each of said movable members of said ejector units are stemmed pistons, and each of said ejector units having a spring engageable with the head portion of said piston thereof to provide a bias to said piston in a direction opposite said first mentioned bias.

7. A hydraulic ejector system as set forth in claim 6 wherein said stemmed piston has one end of the stem thereof extending outwardly of said ejector units.

8. A hydraulic ejector system as set forth in claim 1 wherein said movable member of said accumulator is a double headed piston.

9. A hydraulic ejector system as set forth in claim 1 wherein said movable member reciprocates along an axis and has a pair of axially spaced head portions.

10. A hydraulic ejector system as set forth in claim 1 wherein said gas is nitrogen.

* * * * *